R. J. HUGHES.
SEWER TRAPS, &c.

No. 175,465.  Patented March 28, 1876.

WITNESSES
Robert Everett
George W. Larner

INVENTOR,
Robert J. Hughes
Gilmore & Co.
ATTORNEYS.

UNITED STATES PATENT OFFICE.

ROBERT J. HUGHES, OF CHICAGO, ILLINOIS.

IMPROVEMENT IN SEWER-TRAPS, &c.

Specification forming part of Letters Patent No. 175,465, dated March 28, 1876; application filed February 19, 1876.

*To all whom it may concern:*

Be it known that I, ROBERT J. HUGHES, of Chicago, in the county of Cook and State of Illinois, have invented a new and valuable Improvement in Sewer-Traps and Deodorizing-Ventilators; and I do hereby declare that the following is a full, clear, and exact description of the construction and operation of the same, reference being had to the annexed drawings making a part of this specification, and to the letters and figures of reference marked thereon.

Figure 1:
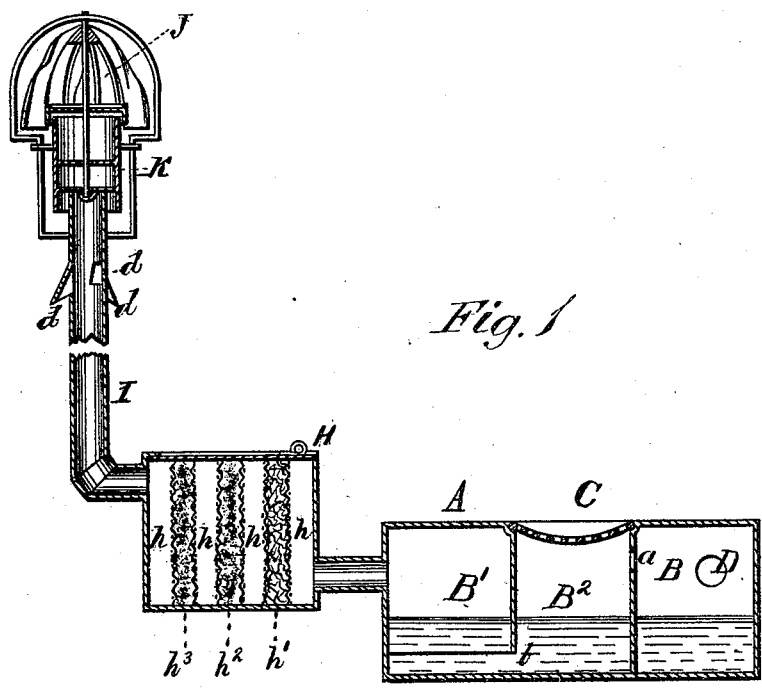
Figure 2:
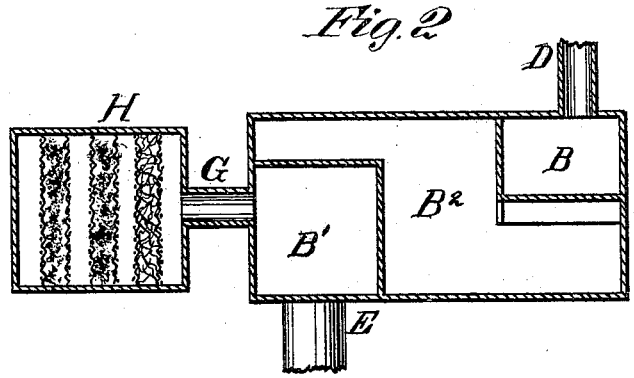
Figure 3:
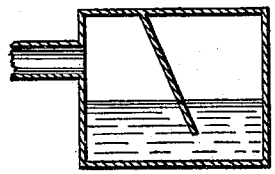

Figure 1 of the drawings is a representation of a longitudinal vertical section of my sewer-trap, and Fig. 2 is a horizontal sectional view thereof. Fig. 3 is a sectional detail view.

My invention has for its object to effectually shut off all sewer gas and stench from dwellings, as will be hereinafter more fully set forth.

In the annexed drawing, A represents the sewer-trap, having two interior water-sealed traps, B B¹, as shown. In the center, between the two traps B B, is an iron grating, C, to receive any rain or surface water from the yard. Where this is not needed an air-tight lid can be used in place of the grating. D is the inlet, and E the outlet. From the trap B an opening, $a$, about on a level with the inlet D, leads into the center chamber B² of the main trap or box A; and an opening, $b$, leads at the bottom into the trap B¹, both traps being water-sealed, as shown in Fig. 1. From the trap B¹ a pipe, G, leads into a filtering-case, H, and from this filtering-case leads the ventilating-shaft I, which is carried up above the roof of the house, and has on its top a cap, J, with fluted fans, said cap revolving on the shaft K. The main shaft I is provided with a series of air-inlets, $d$, and an exterior shaft, K, over which the revolving cap turns.

The pure air, entering through the lower inlets $d$ and ascending the main shaft, forces up the sewer-gas; and, further, the air, entering through the passage between the exterior and interior shafts, near the top, gives a final force to the ascending current, which is caught by the action of the revolving cap and dispelled.

The filtering-box H is made air-tight, and consists of three alternate chambers or galleries, $h^1$ $h^2$ $h^3$, made of galvanized-wire screens, having air-chambers $h$ between them. The first chamber, $h^1$, contains vegetable and animal charcoal. The second chamber, $h^2$, contains a layer of fine cotton-wool, impregnated with finely-powdered lime. The third contains a layer of fine cotton-wool, suffused with a strong solution of chloride of zinc.

In the event of any gas entering the outlet-trap before it could reach the inlet-trap, it would be arrested by the ventilating-pipe, and, passing through the filter, become innoxious.

The exit of the gas is almost instantaneously caused by the suction of the revolving Archimedean-screw top fixed to the ventilating-pipe, which acts like a pump.

By this means all sewer gas and stench are effectually excluded from the dwelling.

What I claim as new, and desire to secure by Letters Patent, is—

1. In a sewer-trap, the two water-sealed traps B B, with intermediate chamber B², passages $a$ $b$, inlet D, and outlet E, all arranged as shown and described.

2. The combination of the trap A, filter H, and ventilating-shaft I, provided with inlets $d$, exterior shaft K, and revolving screw-cap J, all constructed substantially as and for the purposes herein set forth.

In testimony that I claim the above I have hereunto subscribed my name in the presence of two witnesses.

ROBERT JAMES HUGHES.

Witnesses:
 LUMLEY INGLEDEW,
 A. B. SMITH.